United States Patent Office 3,462,674
Patented Aug. 19, 1969

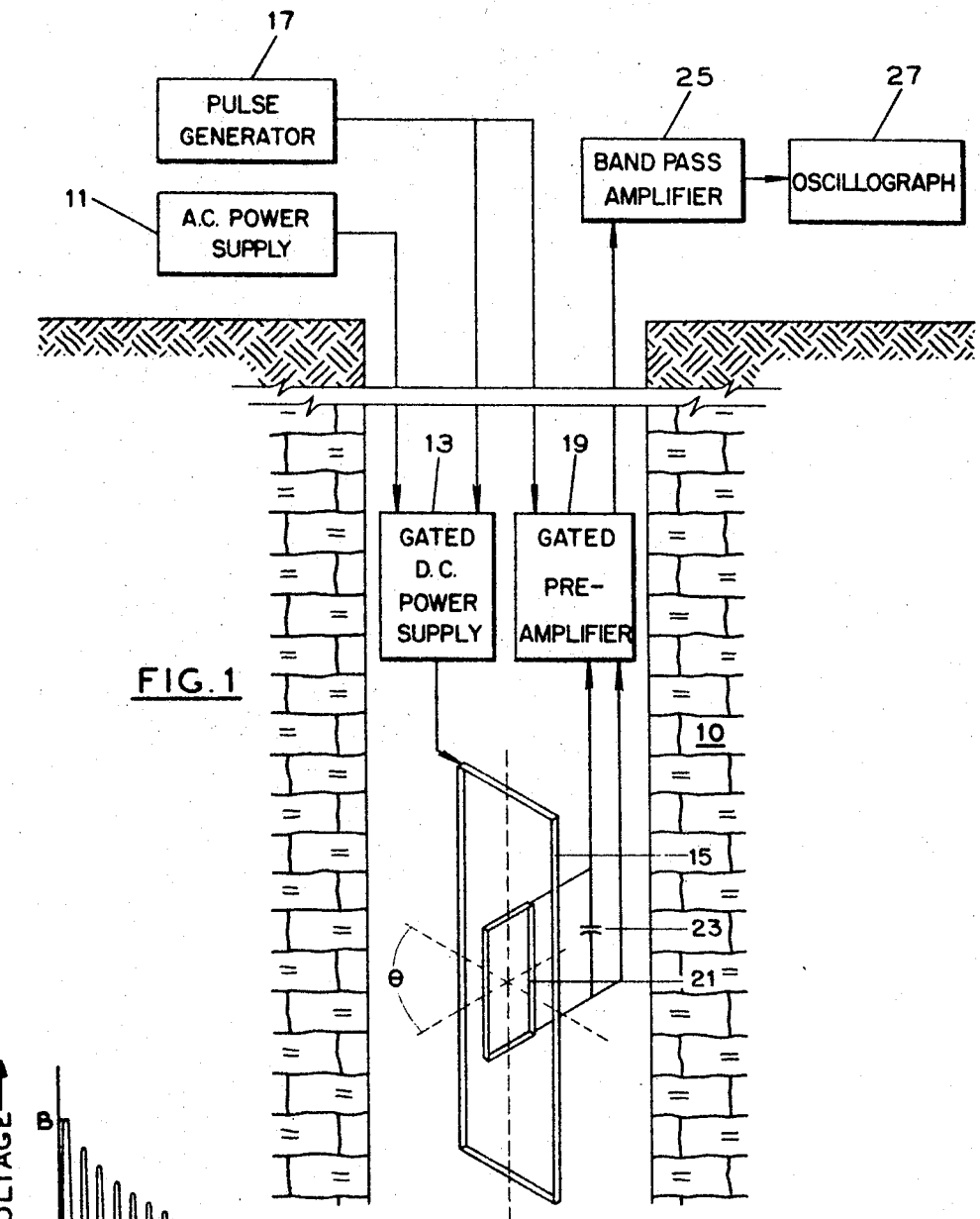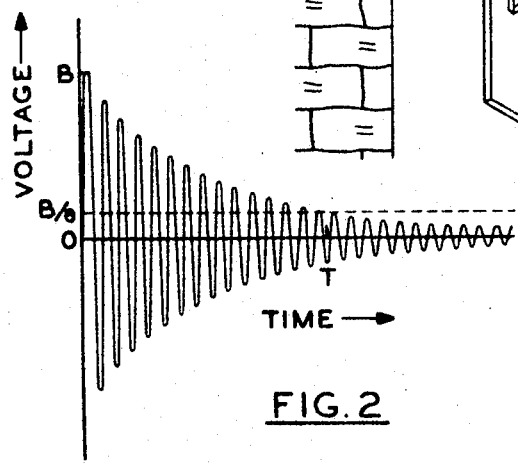

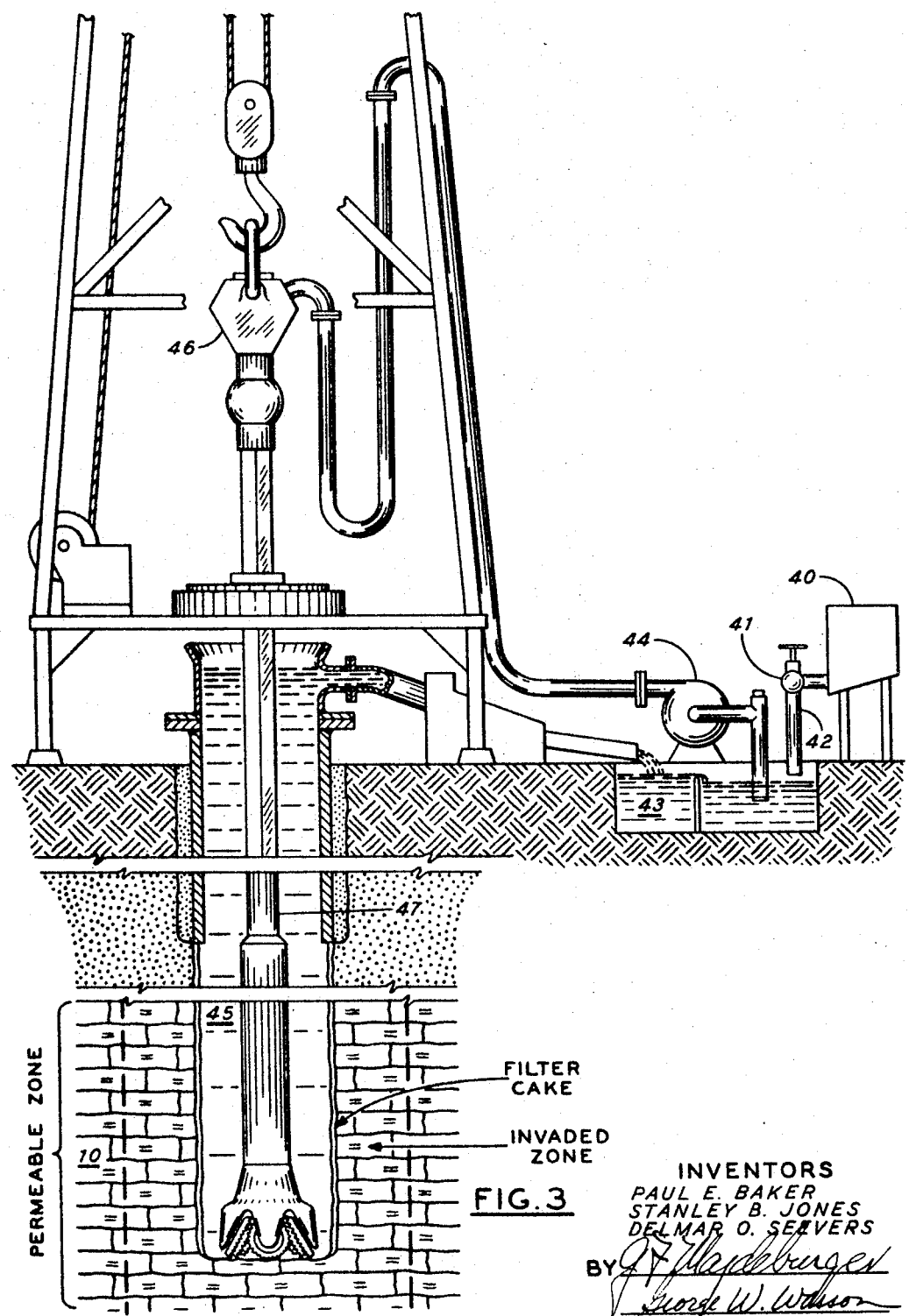

3,462,674
NUCLEAR MAGNETISM WELL LOGGING METHOD
Paul E. Baker, Fullerton, Stanley B. Jones, Whittier, and Delmar O. Seevers, Fullerton, Calif., assignors to Chevron Research Company, San Francisco, Calif., a corporation of Delaware
Continuation-in-part of application Ser. No. 762,291, Sept. 22, 1958. This application Nov. 17, 1965, Ser. No. 508,342
Int. Cl. H01s 4/00; G01n 27/78; G01r 33/08
U.S. Cl. 324—.5                                                                 4 Claims

ABSTRACT OF THE DISCLOSURE

Nuclear magnetism precession signals may be detected from the proton in hydrogen atoms within and surrounding a well bore penetrating an earth formation. The hydrogen atoms may be found in either hydrocarbons or waters. To identify the material containing the hydrogen atoms it is proposed to introduce paramagnetic impurities that will selectively control the precession signals from either oil or water. Detected nuclear magnetic precession signals may then be interpreted to identify the origin of the signals.

---

This application is a continuation-in-part of our application for "Analytical Device," Ser. No. 762,291, filed Sept. 22, 1958, as a division of application Ser. No. 337,384, filed Feb. 17, 1953, now Patent No. 3,213,354, issued Oct. 19, 1965.

Our invention relates to a method for differentiating substances by their nuclear magnetic resonance properties and particularly to a logging method for locating hydrogenous fluids and distinguishing between water and oil in the formation around a borehole.

It is the object of our invention to measure the nuclear magnetic precession signals of hydrogen nuclei precessing in the earth's magnetic field when the nuclei are present within hydrogenous fluids contained in the formations surrounding a borehole and to control selectively the source of these signals to identify the presence of petroleum crude within the formations when both water and crude are present.

The selective control is accomplished by intentionally shortening the so-called nuclear magnetic relaxation time of the water in the formation surrounding the borehole. For purposes of this specification, the relaxation time may be defined as the decay time of the nuclear magnetic logging signal. The signal, described in more detail later, is usually an exponentially decaying sine wave and the relaxation time is then definable as the time in which the envelope amplitude of the wave decays to $1/e$ of its initial value ($e$ being the natural logarithm base).

It has been observed that the effective relaxation time of a given nucleus can be altered by positioning paramagnetic impurities adjacent to the nucleus. These observations are described in "The Nuclear Induction Experiment," F. Bloch, W. W. Hansen and M. Packard, Physical Review, vol. 70, Nos. 7 and 8, Oct. 1 and 15, 1946, and in U.S. Patent Re. 23,950, F. Bloch and W. W. Hansen, for "Method and Means for Chemical Analysis by Nuclear Induction," original filed Dec. 23, 1946 (U.S. Patent 2,561,489), and issued July 24, 1951. In the publication the effect of the introduction of impurities into water is described as shortening the relaxation time. In the patent this effect is described as being operable to vary the relaxation time through a wide range by introducing what is there called a catalyst. As described, the catalysts greatly alter the rate at which equilibrium or alignment with an external magnetic field is established, but do not participate in any other way. Any atom, molecule, ion, etc., possessing a permanent magnetic moment in the electron part of the atom, i.e., any paramagnetic substance or impurity may act as a catalyst. For example, the Bloch et al. patent suggests the use of paramagnetic salts of iron and manganese and dissolved oxygen.

In the art to which this invention applies skilled persons will be aware that the impurities described herein must be paramagnetic and must be capable of entering into solution in the fluid whose relaxation time is to be determined. In the specific well logging environment contemplated these impurities must be capable of being in solution in the continuous liquid phase of the drilling fluid and, if their use as a part of the filtrate is contemplated, they must be able to pass through the filter cake on the face of the well bore and into the adjacent formations with the filtrate. Such materials include the salts of iron, manganese, chromium, etc., e.g., compounds such as the ferric nitrate $Fe(NO_3)_3$ suggested by Bloch et al., Physical Review 70 (supra).

Oil generally has a higher viscosity than water and, for that reason, oil can be characterized as having a shorter relaxation time than water. Oil and water within the earth, however, contain a wide assortment of impurities. Paramagnetic impurities within a hydrogenous liquid tend to shorten the relaxation time of the protons therein. A very small quantity of paramagnetic impurity in the liquids has a gross effect on the relaxation time. Thus, the amount of paramagnetic impurity within the formation waters or crude oil may, at times, be the single determinant which determines whether oil or water will have the longer relaxation time.

A number of studies have been made of the variations in the quantity of various impurities in oil and water within the earth. Among the paramagnetic impurities in formation water, iron is usually the principal constituent and substantial amounts of manganese and chromium are common. These impurities appear as ions of those elements. In oil, vanadium is usually the principal paramagnetic impurity, while iron and nickel are important paramagnetic impurities. In the case of oil, these impurities most usually appear as chemically attached elements on a complex petroleum molecule. Analyses indicate that formation waters may have from less than one part per million paramagnetic impurity to one percent paramagnetic impurity. Oils have been analyzed and have been found to have from less than one part per million paramagnetic impurity to 100 parts per million. Paramagnetic impurities of less than 100 parts per million are sufficient to affect strongly the relaxation time of protons within the oil. A similar effect exists in water. In the case of both oil and water, the effect of the presence of most paramagnetic impurities is to shorten the relaxation time. Accordingly, if the formation water in a well which is tested by our nuclear resonance method has no measurable paramagnetic impurity while the oil within the formation adjacent to the same well has of the order of 100 parts per million, the oil will have a measurably shorter relaxation time. Conversely, if the water has a high concentration of paramagnetic impurities and the oil has less paramagnetic impurity, the protons in the water may have a measurably shorter relaxation time.

Waters from a number of oil fields in widely distributed geographical locations have been tested, and it is often possible before a well logic made to know whether the oil or water will have a greater concentration of paramagnetic impurities. If this difference in the concentration of paramagnetic impurities is great enough, the paramagnetic impurities themselves will determine which material will have the greater relaxation time and a log can be interpreted accordingly.

If the concentration of paramagnetic impurity within the well is essentially the same for water and oil, oil will generally have the shorter relaxation time. Thus, on the basis of previous tests, such characteristics of the oil and water are measured in order that the nuclear resonance log may be interpreted as an indication of whether the formation contains oil or water.

In accordance with the present invention the concentration of paramagnetic impurity within the well and surrounding formations may be controlled to selectively control the relaxation time of the protons in either or both of the fluids present in the formation. The more useful form of our invention is to control the relaxation time of water protons so that any precessional signals that are detected can be attributed to protons in formation oils.

The novel features of our invention are set forth with more particularity in the accompanying claims. The invention itself, however, with respect to the details thereof, together with its additional objects and advantages, may be better understood from the following description of specific embodiments with reference to the accompanying drawings, in which:

FIGURE 1 is a schematic diagram of an exemplary embodiment of a nuclear magnetic resonance relaxation time logger according to our invention;

FIGURE 2 is a graph of signal voltage versus time for only one hydrogenous fluid;

FIGURE 3 is a schematic diagram of an apparatus for drilling a well into an earth formation and illustrates one method of introducing materials as contemplated in the present invention.

In FIGURE 1, parts of a logging instrument are represented within a borehole surrounded by the earth formation 10.

As shown in FIGURE 1, a 110 volt, 60 cycle power supply 11 feeds into a gated DC power supply 13 which provides direct current to the polarizing coil 15. A pulse generator 17 controls the DC power supply 13 and the gated preamplifier 19. A detector coil 21 is connected in parallel with a capacitor 23 and feeds into the gated preamplifier 19. The preamplifier 19 feeds current through the band pass amplifier 25 to the oscillograph 27.

The pulse generator 17 generates pulses constituting negative voltage square waves. It is adapted to be adjusted so that the duration of the negative pulse and of the interval between pulses from the generator 17 may be varied over a substantial range. The pulse generator is so connected into the preamplifier 19 that it gates the preamplifier 19. The pulse generator 17 is also connected to the gated DC power supply 13.

The gated DC power supply 13 may consist of a rectifier together with means for rapidly switching ON and OFF the electrical current through the polarizing coil 15. Such a switching means is described in U.S. Patent 2,561,490, R. H. Varian, filed Oct. 21, 1948, and issued July 24, 1951.

The current through the polarizing coil 15 sets up a magnetic field in the formation and that field establishes a macroscopic nuclear magnetic moment with a component in the direction of the axis of coil 15. If the magnetic field of the coil 15 is removed quickly enough, the macroscopic moment will precess about the earth's magnetic field.

The gated preamplifier 19 is also controlled by the pulse generator 17 and is gated OFF until the DC polarizing field has reached zero. This is done to prevent the voltages induced in the detector coil by the switching of the polarizing coil from blocking the amplifier 25.

As soon as the DC polarizing field of the coil 15 is effectively zero, the amplifier 19 is gated ON and the nuclear signals are picked up by the tuned detector 21–23, amplified, and recorded on the oscillograph 27. The coil 21 detects the signal from the precessing protons in a manner somewhat similar to the action of a transformer secondary. The angle $\theta$ between coil 21 and coil 15 may have an arbitrary value. When it is desired to minimize the signal induced in coil 21 by coil 15, $\theta$ should be equal to 90 degrees. The capacitor 23, in conjunction with coil 21, forms a tuned circuit. The oscillograph may be either a cathode ray oscilloscope, the face of which is photographed in order to record the signal on its face, or the oscillograph may be another type of recording instrument.

It is not necessary that coil 15 and coil 21 be physically separate coils. It is a simple matter for one skilled in the art to use one and the same coil for both polarization and detection purposes and in the preferred form of the well logging tool of this invention a single coil construction is used.

FIGURE 2 represents a typical result of the operations described above. It is a voltage versus time curve that is approximately an exponentially damped sine wave. The envelope of the curve is an exponential decay curve, and the sine wave frequency under the envelope is the Larmor precession frequency of protons in the earth's magnetic field.

In the nuclear magnetic logging of drilled wells in which signals like that represented in FIGURE 2 are obtained it is possible to determine from the data two kinds of relaxation times, one of them being the time constant of the exponential decay represented in FIGURE 2. The other is called the thermal relaxation time and it can be calculated, for instance, from two sets of results of the sort represented in FIGURE 2, which differ in the amount of polarization time that preceded the measurements. The amount of the polarization time is controlled by the duration of the negative pulse from the pulse generator 17. For purposes of describing the present invention, it is necessary only to discuss the one relaxation time represented by the decay time in FIGURE 2.

A primary purpose of nuclear magnetic logging of a drilled well is to detect oil in the formation surrounding the borehole, and to distinguish any signal that might indicate oil from a masking signal that might be coming only from water. The signals expected from oil and from water in the earth's magnetic field do not differ significantly in their Larmor precession frequencies, so if they are to be distinguished, the distinction needs to be on the basis of their relaxation times.

In accordance with this invention, paramagnetic impurities are introduced into the drilling fluid in the well bore. Only those paramagnetic impurities are used that can form true solutions in the base water of the drilling fluid, and can stay in the drilling fluid filtrate as it goes through the colloidal pores of the drilling fluid filter cake on the wall of the borehole. After passage through the filter cake, the drilling fluid filtrate and its dissolved paramagnetic impurities diffuse into the formation water, again forming a true chemical solution. The dissolved paramagnetic impurity in the formation water causes that water to have a greatly shortened relaxation time, so that when a nuclear magnetic logging measurement is made, and a result is obtained of the sort represented in FIGURE 2, it is certain that the signal in evidence is substantially wholly from oil, the water signal having decayed so rapidly that it does not show.

Usually, the paramagnetic impurity is added to a water base drilling mud during the process of drilling the well bore through an earth formation. Another alternative is to add the paramagnetic impurities to the mud remaining in the well bore after the well has been drilled by recirculating the mud and adding the materials to the mud pit at the earth's surface. Sufficient pressure will have to be maintained on the mud at the depth opposite to the formation where the relaxation times of the water protons are to be affected so that the paramagnetic materials will pass with a filtrate, through the filter cake along the face of the well bore, back into the formations where it is expected that crude oil is to be found. The technique of adding materials to drilling fluids and well bore muds and the production of formation filtrates is well known to those skilled in the well logging arts and is illustrated and described in "Composition and Properties of Oil Well Drilling Fluids," W. F. Rogers, Gulf Publishing, 1953.

A preferred form of apparatus and a method for carrying out the present invention is illustrated in FIGURE 3. The apparatus as illustrated provides a means for introducing the paramagnetic materials into the well bore and into the formations around the well bore as the well is being drilled through the earth formations. The paramagnetic materials are thus introduced to modify the relaxation time of the protons within the fluids in and around the well bore. As seen in FIGURE 3 a hopper 40 is connected through a valve 41 and line 42 to the mud pit 43 where recirculating drilling mud is accumulated. A pump 44 supplies the drilling fluid 45 to the conventional swivel 46 and drill string 47. The paramagnetic materials from the hopper 40 are thus mixed and dissolved in the drilling fluid during the drilling of the well.

It should be apparent that alternative forms of introducing the paramagnetic materials into the drilling fluids and into the earth formations with the filtrate are contemplated. The form illustrated in FIGURE 3 is merely illustrative of a successful way of introducing the paramagnetic materials as the well bore is being drilled through an earth formation.

In performing the method of present invention, it will be apparent that after the relaxation time modifying agent, the paramagnetic material or impurity, has been introduced and circulated with the drilling fluid to treat the well fluids, the nuclear magnetism logging run will be performed. The logging operation includes the steps of passing a polarizing current through the coil 15 so as to generate a polarizing field within and surrounding the well bore, then periodically interrupting the polarizing field by actuating the gated DC power supply 13 so as to initiate precession in the earth's field of the previously polarized protons remaining within the earth formation 10, then detecting the precessional signals from the protons precessing in the earth's field, and recording the signals induced by the precessing protons in the coil 21 as displayed on the face of the oscillograph 27. The relaxation time of the recorded signals may then be measured. The recorded signals will also be identified in accordance with the position of the well logging tool along the depth of the well bore within the earth formation.

While certain preferred embodiments of the invention have been specifically disclosed, it should be understood that the the invention is not limited thereto as many variations will be readily apparent to those skilled in the art and the invention is to be given its broadest possible interpretation within the terms of the following claims.

We claim:

1. A method for detecting the presence of oil in an earth formation surrounding a well bore comprising the steps of introducing into the formation a filtrate containing dissolved paramagnetic impurities selectively soluble in the formation waters and operative to reduce selectively the nuclear magnetic relaxation time of protons in said water with respect to those in oil, initiating nuclear magnetic precession in protons present in the formation, detecting the signals of nuclear magnetic precession of said protons, and measuring in said signals the nuclear magnetic relaxation time of the protons present in the formation as an indication of the presence of oil.

2. A method for detecting the presence of oil in an earth formation surrounding a well bore comprising the steps of introducing into the formation through the filter at the face of the well bore a filtrate fluid containing in solution a paramagnetic material capable of diffusing into the formation waters and being operative to reduce selectively the nuclear magnetic relaxation time of protons in said filtrate fluid and formation water with respect to those in oil, initiating nuclear magnetic precession in protons present in the formation, detecting the signals of nuclear magnetic precession of said protons, and measuring the nuclear magnetic relaxation time of the protons present in the formation.

3. A method for detecting the presence of a fluid in the class of oil and water in a well formation comprising introducing into the formation paramagnetic impurities operative to reduce selectively the nuclear magnetic relaxation time of protons in one of said fluids while not affecting the nuclear magnetic relaxation time of protons in the other of said fluids, initiating nuclear magnetic precession in protons present in the formation, and measuring the nuclear magnetic relaxation time of the protons present in the formation.

4. A method for detecting the presence of oil in an earth formation penetrated by a well bore comprising the steps of introducing into the formation paramagnetic impurities soluble in formation waters and operative to reduce selectively the nuclear magnetic relaxation time of protons in water with respect to those in oil, initiating nuclear magnetic precession in protons present in the formation, and measuring the nuclear magnetic relaxation time of the protons present in the formation.

References Cited

UNITED STATES PATENTS

| | | | |
|---|---|---|---|
| 3,135,912 | 6/1964 | Baker | 324—0.5 |
| 3,188,556 | 6/1965 | Worthington | 324—0.5 |
| 3,213,354 | 10/1965 | Baker | 324—0.5 |
| 3,289,072 | 11/1966 | Schuster | 324—0.5 |

RUDOLPH V. ROLINEC, Primary Examiner

M. J. LYNCH, Assistant Examiner